(12) United States Patent
Ning et al.

(10) Patent No.: US 12,314,728 B2
(45) Date of Patent: May 27, 2025

(54) METHOD AND APPARATUS FOR BIOS OPTION MODIFICATIONS TO TAKE EFFECT, NON-VOLATILE READABLE STORAGE MEDIUM, AND ELECTRONIC DEVICE

(71) Applicant: SUZHOU METABRAIN INTELLIGENT TECHNOLOGY CO., LTD., Jiangsu (CN)

(72) Inventors: Zhaonan Ning, Jiangsu (CN); Bing Wang, Jiangsu (CN); Binghui Zhang, Jiangsu (CN); Muqing Tian, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/850,476

(22) PCT Filed: Mar. 16, 2023

(86) PCT No.: PCT/CN2023/081990
§ 371 (c)(1),
(2) Date: Sep. 24, 2024

(87) PCT Pub. No.: WO2024/103583
PCT Pub. Date: May 23, 2024

(65) Prior Publication Data
US 2025/0110749 A1    Apr. 3, 2025

(30) Foreign Application Priority Data
Nov. 17, 2022 (CN) .......................... 202211461784.9

(51) Int. Cl.
*G06F 9/4401* (2018.01)

(52) U.S. Cl.
CPC .............................. *G06F 9/4401* (2013.01)

(58) Field of Classification Search
CPC .................................................... G06F 9/4401
(Continued)

(56) References Cited

U.S. PATENT DOCUMENTS 10,204,011 B1 * 2/2019 Burriss ............... G06F 11/1438
2013/0198504 A1   8/2013 Arnold et al.
(Continued)

FOREIGN PATENT DOCUMENTS

| CN | 109308196 A | 2/2019 |
|---|---|---|
| CN | 113867814 A | 12/2021 |

(Continued)

OTHER PUBLICATIONS

Translation of PCT International Search Report mailed on Jun. 21, 2023 for PCT/CN2023/081990 (2 pages).
(Continued)

*Primary Examiner* — Michael J Brown
(74) *Attorney, Agent, or Firm* — Merchant & Gould P.C.

(57) ABSTRACT

A method and apparatus for BIOS option modifications to take effect, a storage medium, and an electronic device. The method for BIOS option modifications to take effect comprises: a BIOS option set, wherein function modification has been executed, is acquired in a server, on BIOS options in the BIOS option set (S202); a set attribute of the BIOS option set is detected, wherein the set attribute is configured to indicate whether there is a cold reboot BIOS option in the BIOS option seta function modified is allowed to take effect after a cold reboot (S204); a server reboot manner for the BIOS option set is determined according to the set attribute, wherein the server reboot manner is configured to control
(Continued)

BIOS options in the BIOS option set to take effect after the server reboots (S206); and the server is rebooted by the server reboot manner (S208).

20 Claims, 4 Drawing Sheets

(58) Field of Classification Search
USPC .................................................. 713/1, 2, 100
See application file for complete search history.

(56) References Cited

U.S. PATENT DOCUMENTS

2022/0066965 A1* 3/2022 Tan .......................... G06F 13/20
2022/0075613 A1* 3/2022 Ramachandran ... G06F 9/45558

FOREIGN PATENT DOCUMENTS

| CN | 114047941 A | 2/2022 |
| CN | 115495161 A | 12/2022 |
| JP | 2015079370 A | 4/2015 |

OTHER PUBLICATIONS

Chinese Search Report for Application No. 2022114617849 (2 pages).

\* cited by examiner

Fig. 7

METHOD AND APPARATUS FOR BIOS OPTION MODIFICATIONS TO TAKE EFFECT, NON-VOLATILE READABLE STORAGE MEDIUM, AND ELECTRONIC DEVICE

CROSS-REFERENCE TO RELATED APPLICATION

This application is a National Stage Application of International Application No. PCT/CN2023/081990 filed on Mar. 16, 2023, which claims the benefit of Ser. No. 20/221, 1461784.9 filed on Nov. 17, 2022 in China, and which applications are incorporated herein by reference. To the extent appropriate, a claim of priority is made to each of the above disclosed applications.

TECHNICAL FIELD

The embodiments of the present application relate to the field of computers, and in particular, to a method and apparatus for BIOS option modifications to take effect, a non-volatile readable storage medium, and an electronic device.

BACKGROUND

With the rapid development of servers, the requirements for server performance are increasingly high, and in addition to performance, the requirements for other indicators in all aspects are also higher and higher. Manufacturers are trying to make a perfect server to meet various requirements of customers. While developing functions, it is also necessary to pay more attention to customer experiences, and any small poor experience may make the customers decide not to continue purchasing servers of the same band.

In the prior art, a specific tool may be used to modify Basic Input Output System (BIOS) options in a server, however, the BIOS option modifications can take effect only after the system is rebooted, and the rebooting modes include warm reboot and cold reboot, wherein after the BIOS options are modified, some functions of the BIOS options only require a warm reboot to take effect, but some functions of the BIOS options must undergo a cold reboot to take effect; at present, after modifying the BIOS options, the users are unclear about the effective rules corresponding to the BIOS options, and therefore, the BIOS options that take effect after a cold reboot may not take effect due to the execution of a warm reboot, or the BIOS options that take effect after a cold reboot may have low taking effect efficiency of the BIOS options due to the execution of a cold reboot, as a cold reboot requires longer time than a hot reboot.

Aiming at the problems in the related art of low taking effect efficiency of the modified BIOS, no effective solution has been proposed.

SUMMARY

The embodiments of the present application provide a method and apparatus for BIOS modifications options to take effect, a non-volatile readable storage medium, and an electronic device, so as to at least solve the problem in the related art of low taking effect efficiency of BIOS modifications.

According to an embodiment of the present application, provided is a method for input/output system (BIOS) option modifications to take effect, including:
  a BIOS option set, wherein function modification has been executed, is acquired in a server, on BIOS options in the BIOS option set;
  a set attribute of the BIOS option set is detected, wherein the set attribute is configured to indicate whether there is a cold reboot BIOS option in the BIOS option set, and the cold reboot BIOS option is an option of which a function modified is allowed to take effect after a cold reboot is executed;
  a server reboot manner for the BIOS option set is determined according to the set attribute, wherein the server reboot manner is configured to control BIOS options in the BIOS option set to take effect after the server reboots; and
  the server is rebooted by the server reboot manner.

In some embodiments, detecting the set attribute of the BIOS option set includes:
  a flag state of a target set flag corresponding to the BIOS option set is detected;
  when the flag state is a set state, the set attribute of the BIOS option set is determined to be a cold boot attribute, wherein the cold boot attribute is configured to indicate that there is a cold reboot BIOS option in the BIOS option set; and
  when the flag state is an unset state, the set attribute of the BIOS option set is determined to be a warm boot attribute, wherein the warm boot attribute is configured to indicate that there is no cold reboot BIOS option in the BIOS option set.

In some embodiments, detecting a flag state of a target set flag corresponding to the BIOS option set includes:
  an execution state of the cold reboot BIOS option is detected during an execution of the function modification, wherein the execution state is configured to indicate whether the function modification is performed on the cold reboot BIOS option;
  according to the execution state, the flag state of the target set flag corresponding to the BIOS option set is determined.

In some embodiments, detecting a flag state of a target set flag corresponding to the BIOS option set includes:
  reading a parameter stored in a state flag register FLAG;
  when the parameter is a first value, that the flag state is determined to be in the set state; and
  when parameter is a second value, that the flag state is determined to be in the unset state.

In some embodiments, determining, according to the execution state, the flag state of the target set flag corresponding to the BIOS option set includes:
  when the execution state indicates that the function modification is not performed on the cold reboot BIOS option during the execution of the function modification, the flag state of the target set flag is determined to be in the unset state; and
  when the execution state indicates that the function modification is performed on the cold reboot BIOS option during the execution of the function modification, the flag state is determined to be converted to the set state.

In some embodiments, before detecting a flag state of a target set flag corresponding to the BIOS option set, the method further includes:

during an execution of the function modification, a target taking effect manner for each target BIOS option on which the function modification has been executed is acquired; and the flag state of the target set flag is processed according to the target taking effect manner.

In some embodiments, acquiring the target taking effect manner for each target BIOS option on which the function modification has been executed includes:

a target option name of each target BIOS option on which the function modification has been executed is acquired; and from effective manners having correlation relationships with options names, the target taking effect manner corresponding to each target BIOS option is acquired, wherein the effective manners includes the cold reboot and warm reboot.

In some embodiments, processing the flag state of the target set flag according to the target taking effect manner includes:

when the target taking effect manner is a warm reboot, the flag state of the target set flag is kept to be in the unset state; and when the target taking effect manner is the cold reboot, the flag state of the target set flag is converted into the set state.

In some embodiments, determining the server reboot manner for the BIOS option set according to the set attribute includes:

when the set attribute is configured to indicate that there is a cold reboot BIOS option in the BIOS option set, the server reboot manner is determined to be the cold reboot; and when the set attribute is configured to indicate that there is no cold reboot BIOS option in the BIOS option set, the server reboot manner is determined to be a warm reboot.

In some embodiments, rebooting the server by the server reboot manner includes:

when the server reboot manner is cold reboot, a user control instruction currently received by the server is detected; and the server is rebooted according to the server reboot manner and the user control instruction; and a user control instruction is executed on the server when the server reboot manner is warm reboot, wherein the user control instruction is an instruction initiated by a user for rebooting the server.

In some embodiments, detecting a user control instruction currently received by the server includes:

an Operating System (OS) corresponding to the server is accessed;

from the Operating System (OS), a user-initiated instruction that is currently received by the server to reboot the server is detected, as the user control instruction.

In some embodiments, rebooting the server according to the server reboot manner and the user control instruction includes:

when the user control instruction instructs to perform the warm reboot on the server, the user control instruction is modified as performing the cold reboot on the server, and a modified user control instruction is executed; and when the user control instruction instructs to perform the cold reboot on the server, the user control instruction is directly executed.

In some embodiments, modifying the user control instruction as performing the cold reboot on the server includes:

a target control instruction carrying cold reboot information is generated; and according to the target control instruction, the user control instruction is modified as performing the cold reboot on the server.

In some embodiments, modifying the user control instruction as performing the cold reboot on the server includes:

the target control instruction is send to a Central Processing Unit (CPU) in the server; and according to the target control instruction, the CPU is controlled to perform the cold reboot on the server.

In some embodiments, controlling, according to the target control instruction, the CPU to perform the cold reboot on the server includes:

register parameters deployed in the server and corresponding to the CPU are modified according to the target control instruction carrying the cold reboot information, wherein the CPU is configured to respond to the target control instruction and control, according to the register parameters, the server to perform the cold reboot.

In some embodiments, modifying the register parameters deployed in the server and corresponding to the CPU according to the target control instruction carrying the cold reboot information includes:

when the CPU receives the cold reboot information, from register parameters having correlation relationships with server reboot manners, a cold reboot register parameter corresponding to the cold reboot is acquired; and the register parameter corresponding to the current CPU is modified as the cold reboot register parameter.

In some embodiments, acquiring a BIOS option set, wherein function modification has been executed, in a server, on BIOS options in the BIOS option set includes:

when it is detected that a BIOS option modification tool is started, an initial BIOS option set is created, wherein the BIOS option modification tool is configured to execute the function modification on the BIOS options;

in a process of the BIOS option modification tool executing the function modification on the BIOS options, target BIOS options on which the function modification has been executed are acquired; and the target BIOS options are added to the initial BIOS option set to obtain the BIOS option set.

According to another embodiment of the present application, also provided is an apparatus for BIOS option modifications to take effect, including:

a first acquisition module, configured to acquire a set of basic input/output system BIOS option, wherein function modification has been executed, in a server, on BIOS options in the BIOS option set a detection module, configured to detect a set attribute of the BIOS option set, wherein the set attribute is configured to indicate whether there is a cold reboot BIOS option in the BIOS option set, and the cold reboot BIOS option is an option of which a function modified is allowed to take effect after a cold reboot is executed;

a determination module, configured to determine a server reboot manner for the BIOS option set according to the set attribute, wherein the server reboot manner is configured to control BIOS options in the BIOS option set to take effect after the server reboots; and a reboot module, configured to reboot the server by the server reboot manner.

According to another aspect of the embodiment of the present application, also provided is a non-volatile readable storage medium which stores a computer program, wherein the computer program is configured to execute, during running, the method for BIOS option modifications to take effect.

According to another aspect of the embodiment of the present application, also provided is an electronic device, including a memory, a processor and a computer program stored in the memory and capable of running on the processor, wherein the processor executes, by means of the computer program, the method for BIOS option modifications to take effect.

In the embodiments of the present application, a BIOS option set, wherein function modification has been executed, is acquired in a server, on BIOS options in the BIOS option set; a set attribute of the BIOS option set is detected, wherein the set attribute is configured to indicate whether there is a cold reboot BIOS option in the BIOS option set, and the cold reboot BIOS option is an option of which a function modified is allowed to take effect only after a cold reboot is executed; according to the set attribute, a server reboot manner for the BIOS option set is determined, wherein the server reboot manner is configured to control all of BIOS options in the BIOS option set to take effect after the server reboots; and the server is rebooted by the server reboot manner, that is, firstly the BIOS option set, of which function modification has been executed is acquired in a server, then the set attribute of the BIOS option set is detected, wherein it can be determined according to the set attribute whether there is a cold reboot BIOS option in the BIOS option set, the cold reboot BIOS option being an option that is allowed to take effect only when the cold reboot is performed on the modified function; then the server reboot manner for the BIOS option set is determined according to the set attribute, i.e., the server reboot manner determined according to the set attribute may control all BIOS options included in the BIOS option set to take effect after the server is rebooted; and finally the server by the server reboot manner is rebooted.

BRIEF DESCRIPTION OF THE DRAWINGS

Accompanying drawings herein are incorporated into the specification and constitute into a part of the specification, show examples consistent with the present application, and are used to explain principles of the present application with the specification.

To describe the technical solutions in the embodiments of the present application or in the existing technology more clearly, the following briefly describes the accompanying drawings required for describing the embodiments or the existing technology. Apparently, a person of ordinary skill in the art may still derive other accompanying drawings from these accompanying drawings without creative efforts.

DETAILED DESCRIPTION OF THE EMBODIMENTS

In order to make the solutions of the application better understood by those skilled in the art, the technical solutions in the embodiments of the application will be clearly and completely described below in combination with the drawings in the embodiments of the application. It is apparent that the described embodiments are not all embodiments but part of embodiments of the application. All other embodiments obtained by those of ordinary skill in the art on the basis of the embodiments in the present application without creative work shall fall within the scope of protection of the present application.

It is to be noted that terms "first", "second" and the like in the description, claims and the abovementioned drawings of the application are configured to distinguish similar objects rather than describing a specific sequence or a precedence order. It should be understood that the data used in such a way may be exchanged where appropriate, in order that the embodiments of the application described here can be implemented in a sequence other than sequences graphically shown or described here. In addition, the terms "include" and "have", and any variations thereof are intended to cover a non-exclusive inclusion, for example, a process, method, system, product, or device that includes a series of steps or units is not necessarily limited to those steps or units that are clearly listed, but may include other steps or units that are not clearly listed or inherent to such process, method, product, or device.

Figure 1:
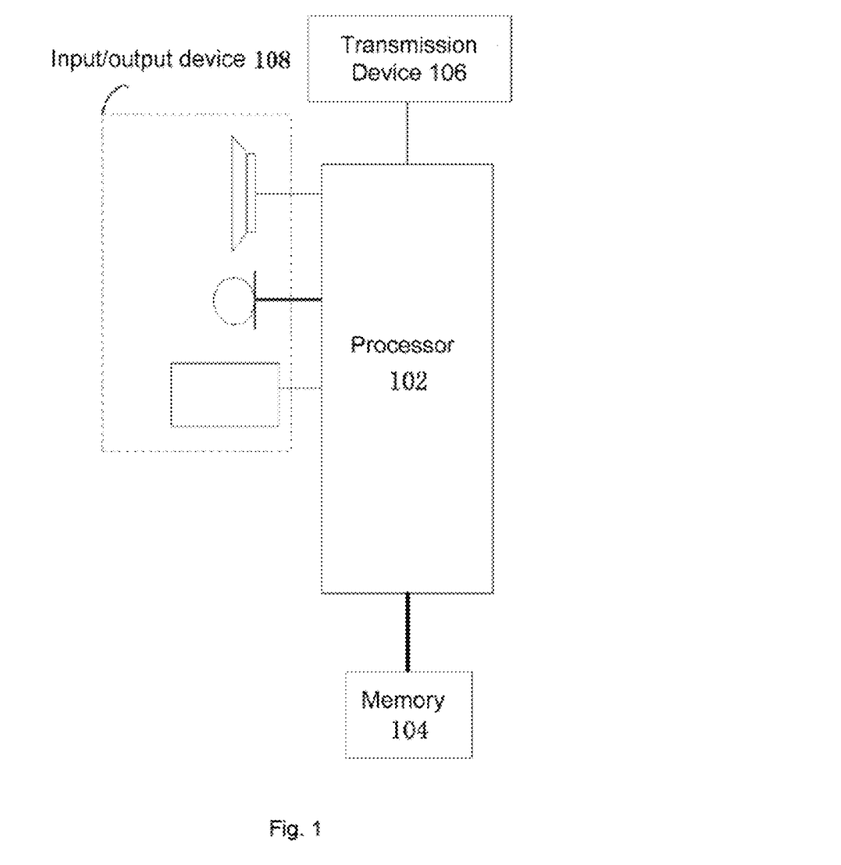
FIG. 1 is a schematic diagram of a hardware environment of a method for BIOS option modifications to take effect according to an embodiment of the present application.

The method embodiment provided in the embodiment I of the present application may be executed in a computer terminal, a device terminal or a similar computing device. By taking running on a computer terminal as an example, FIG. 1 is a schematic diagram of a hardware environment of a method for BIOS option modifications to take effect according to an embodiment of the present application. As shown in FIG. 1, a computer terminal may include one or more processors 102 (only one is shown in FIG. 1) (the processor 102 may include, but is not limited to, a processing device such as a microprocessor (MCU) or a programmable logic device (FPGA)) and a memory 104 for storing data. In one exemplary embodiment, the computer terminal above can further include a transmission device 106 for a communication function and an input/output device 108. Those ordinarily skilled in the art can appreciate that the structure shown in FIG. 1 is for illustrative purposes only, but not limit the structure of the computer terminal. For example, the computer terminal may further include more or fewer components than those shown in FIG. 1, or has a different configuration with equivalent or more functions than those shown in FIG. 1.

The memory 104 may be configured to store a computer program, for example, a software program and a module of application software, such as a computer program corresponding to the method for BIOS option modifications to take effect in the embodiments of the present application. The processor 102 runs the computer program stored in the memory 104, so as to execute various function applications and data processing, that is, to implement the foregoing method. The memory 104 may include a high-speed random access memory, and may also include a non-transitory memory, such as one or more magnetic storage apparatuses, flash memories, or other non-transitory solid-state memories. In some instances, the memory 104 may further include a memory remotely located from the processor 102, and the remote memory may be connected to the computer terminal by a network. Examples of the network above includes, but is not limited to, an Internet, intranets, a local area network, a mobile communication network, and combinations thereof.

The transmission device 106 is configured to receive or transmit data over a network. Optional examples of the network may include a wireless network provided by a communication provider of the computer terminal. In one example, the transmission device 106 includes a network interface controller (NIC) which may be connected to other network devices by means of a base station, thereby being able to communicate with the Internet. In one example, the transmission device 106 may be a radio frequency (RF) module for communicating wirelessly with the Internet.

Figure 2:
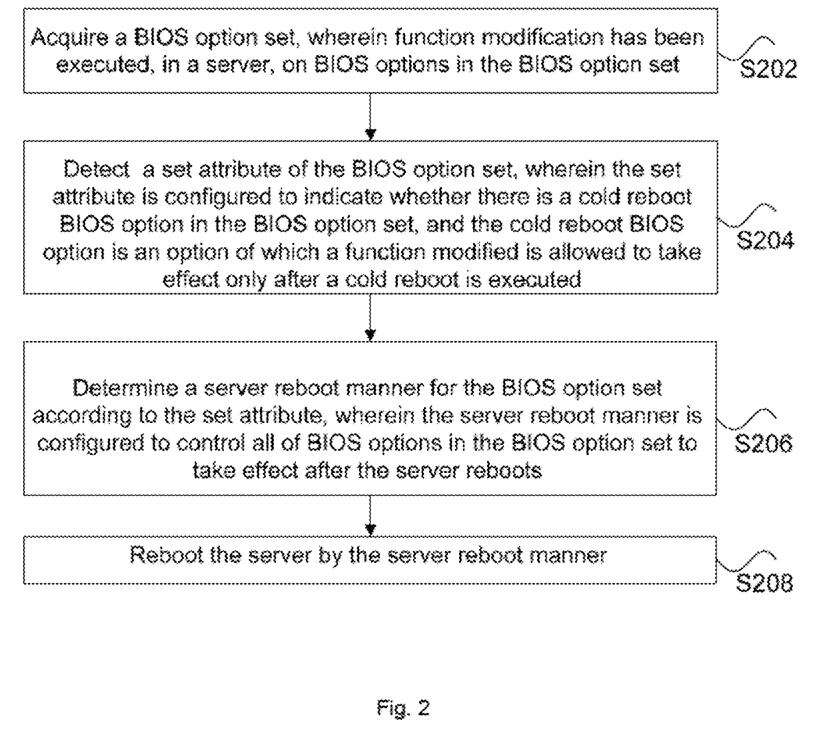
FIG. 2 is a flowchart of a method for BIOS option modifications to take effect according to an embodiment of the present application.

The present embodiment provides a method for BIOS option modifications to take effect, which is applied to the computer terminal. FIG. 2 is a flowchart of a method for BIOS option modifications to take effect according to an embodiment of the present application. As shown in FIG. 2, the flow includes the following steps:

step S202: a BIOS option set, wherein function modification has been executed, is acquired in a server, on BIOS options in the BIOS option set;

step S204: a set attribute of the BIOS option set is detected, wherein the set attribute is configured to indicate whether there is a cold reboot BIOS option in the BIOS option set, and the cold reboot BIOS option is an option of which a function modified is allowed to take effect after a cold reboot is executed;

step S206: a server reboot manner for the BIOS option set is determined according to the set attribute, wherein the server reboot manner is configured to control BIOS options in the BIOS option set to take effect after the server reboots;

step S208: the server is rebooted by the server reboot manner.

By following the above steps, firstly the BIOS option set, of which function modification has been executed is acquired in a server, then the set attribute of the BIOS option set is detected, wherein it can be determined according to the set attribute whether there is a cold reboot BIOS option in the BIOS option set, the cold reboot BIOS option being an option that is allowed to take effect only when the cold reboot is performed on the modified function; then the server reboot manner for the BIOS option set is determined according to the set attribute, i.e., the server reboot manner determined according to the set attribute may control all BIOS options included in the BIOS option set to take effect after the server is rebooted; and finally the server by the server reboot manner is rebooted. By means of the technical solution, the problem in the related art of low taking effect efficiency of BIOS modifications is solved, and the technical effect of improving the taking effect efficiency of BIOS modifications is achieved.

In the technical solution provided in step S202, the server may be, but is not limited to, any electronic device that is capable of responding to a service request, carrying a service, and ensuring the service, and the server may provide a computation or application service for other clients (such as a personal computer (PC), a smart phone, and an automated teller machine (ATM) or even large-scale equipment such as a train system) in the network. The stable running of a server directly affects the stable running of a service borne by the server. Currently, BIOS options in the server can take effect by means of a reboot after being modified, wherein the reboot includes a warm reboot and a cold reboot, after the BIOS options are modified, some functions of the BIOS options only require the warm reboot to take effect, but some functions of the BIOS options requires the cold reboot to take effect; at present, after modifying the BIOS options, that is, the BIOS option and a reboot manner for taking effect of the modification need to match.

Figure 3:
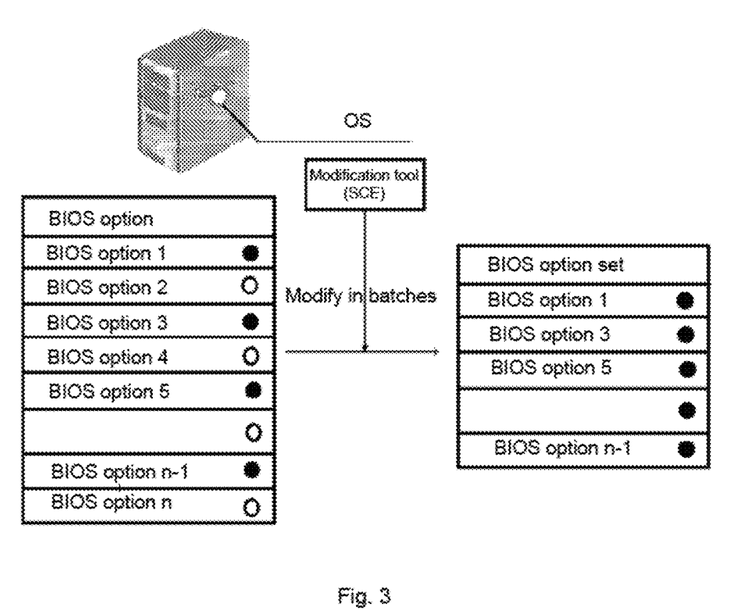
FIG. 3 is a schematic diagram of a BIOS option modification according to an embodiment of the present application.

In some embodiments, in the present embodiment, the BIOS options in the server may be modified in batches by using a specific tool under an Operating System (OS). FIG. 3 is a schematic diagram of a BIOS option modification according to an embodiment of the present application. As shown in FIG. 3, a server has BIOS options (BIOS option 1 to BIOS option n), the server uses a specific tool (SCE tool) under an OS to perform batch modification to obtain a BIOS option set which includes {BIOS option 1, BIOS option 3, BIOS option 5, . . . , BIOS option n-1}.

In one exemplary embodiment, a basic input/output system (BIOS) option set, wherein function modification has been executed, in a server, on BIOS options in the BIOS option set may be acquired in, but is not limited to, the following manners: when it is detected that a BIOS option modification tool is, creating an initial BIOS option set is created, wherein the BIOS option modification tool is configured to execute the function modification on the BIOS options; in a process of the BIOS option modification tool executing the function modification on the BIOS options, target BIOS options on which the function modification has been executed are acquired; and the target BIOS options are added to the initial BIOS option set to obtain the BIOS option set.

In some embodiments, in the present embodiment, foregoing function modification may be performed on BIOS options by using, but is not limited to, the option modification tool. The option modification tool may be, but is not limited to, an SCE tool used by the Operating System (OS) corresponding to a server.

In the technical solution provided in step S204, the cold reboot BIOS option is an option of which a function modified is allowed to take effect only after the cold reboot, that is to say, such a BIOS option takes effect by performing the cold reboot on the server after the corresponding function is modified, wherein the cold reboot may refer to, but is not limited to, reboot the server by turning off power and then turning on the power. A corresponding modification function may not take effect when a warm reboot is executed on the cold reboot BIOS option, wherein the warm reboot may refer to, but is not limited to, reboot the computer by software control without turning down the power.

In some embodiments, in the present embodiment, a concept corresponding to the cold reboot BIOS option may be a hot reboot BIOS option, and a hot reboot BIOS option modification function may take effect when the cold reboot and the hot reboot are performed on the server.

In one exemplary embodiment, the set attribute of the BIOS option set may be detected in, but is not limited to, the following manners: a flag state of a target set flag corresponding to the BIOS option set is detected; when the flag state is a set state, the set attribute of the BIOS option set is determined as a cold boot attribute, wherein the cold boot attribute is configured to indicate that there is a cold reboot BIOS option in the BIOS option set; and when the flag state is an unset state, the set attribute of the BIOS option set is determined as a warm boot attribute, wherein the warm boot attribute is configured to indicate that there is no cold reboot BIOS option in the BIOS option set.

Figure 4:
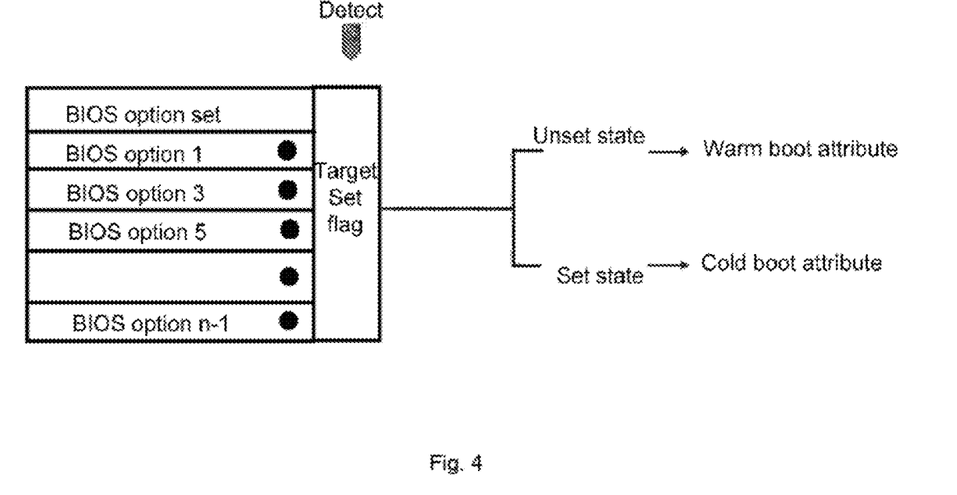
FIG. 4 is a schematic diagram of set attribute detection according to an embodiment of the present application.

In some embodiments, in the present embodiment, FIG. 4 is a schematic diagram of set attribute detection according to an embodiment of the present application. As shown in FIG. 4, all the BIOS options in the BIOS option set {BIOS option 1, BIOS option 3, BIOS option 5, . . . , BIOS option n-1} have been modified; the target set flag corresponding to the BIOS option set may have two states, i.e. an unset state and a set state, targets set flag of a BIOS option set are detected; and when it is detected that the target set flags are in the unset state, it indicates that there is no cold reboot BIOS option in the BIOS option set in this case, and it may be determined that the set attribute of the BIOS option set is a warm boot attribute, that is, a hot reboot may be performed on the server to allow the BIOS option set to take effect; when it is detected that target set flags are in the set state, it indicates that there are the cold reboot BIOS options in the BIOS option set in this case, and it can be determined that the set attribute of the BIOS option set is a cold boot attribute, that is to say, the cold reboot can be performed on the server to allow the BIOS option set to take effect.

In one exemplary embodiment, the flag state of the target set flag corresponding to the BIOS option set may be detected in, but is not limited to, the following manners: an execution state of the cold reboot BIOS option is detected during an execution of the function modification, wherein the execution state is configured to indicate whether the function modification is performed on the cold reboot BIOS option; and according to the execution state, the flag state of the target set flag corresponding to the BIOS option set is determined.

In some embodiments, in the present embodiment, the execution state of the cold reboot BIOS option is directly related to the flag state of the target set flag, and during the execution of function modification, the flag state of the target set flag corresponding to the BIOS option set may be determined according to the execution state of the cold reboot BIOS option.

In one exemplary embodiment, the flag state of the target set flag corresponding to the BIOS option set may be detected in, but is not limited to, the following manners: a parameter stored in a state flag register (FLAG) is read; when the parameter is a first value, the flag state is determined to be in the set state; and when the parameter is a second value, the flag state is determined to be in the unset state.

In some embodiments, in the present embodiment, the method for detecting the flag state of the target set flag may be reading a parameter stored in a state flag register FLAG, and then making a determination according to the parameter, for example, when it is detected that the parameter stored in the FLAG is A (the first value), the flag state is determined to be in the set state; and when it is detected that the parameter stored in the FLAG is B (the second value), the flag state is determined to be in the unset state.

In one exemplary embodiment, the flag state of the target set flag corresponding to the BIOS option set may be determined according to the execution state in, but is not limited to, the following manners: when the execution state indicates that the function modification is not performed on the cold reboot BIOS option during the execution of the function modification, the flag state of the target set flag is determined to be in the unset state; and when the execution state indicates that the function modification is performed on the cold reboot BIOS option during the execution of the function modification, the flag state is determined to have been converted to the set state.

In some embodiments, in the present embodiment, default state of the flag state may be set to the unset state, but when the execution state indicates that the function modification is performed on the cold reboot BIOS option during the execution of the function modification, the flag state is converted into the set state.

In one exemplary embodiment, before detecting the flag state of the target set flag corresponding to the BIOS option set, the method may further include but is not limited to the following manners: during an execution of the function modification, a target taking effect manner for each target BIOS option on which the function modification has been executed is acquired; and the flag state of the target set flag is processed according to the target taking effect manner.

In some embodiments, in the present embodiment, since the flag state of the target set flag is directly related to the subsequent selection and execution of the server reboot manner, the flag state of the target set flag may be determined in the target taking effect manner of each target BIOS option on which the function modification has been performed.

In one exemplary embodiment, a target effective manner for each target BIOS option, on which function modification has been executed, may be acquired in, but is not limited to, the following manners: a target option name of each target BIOS option on which the function modification has been executed is acquired; and from effective manners having correlation relationships with options names, the target taking effect manner corresponding to each target BIOS option is acquired, wherein the effective manners includes the cold reboot and the warm reboot.

In some embodiments, in the present embodiment, as shown in FIG. 3, during the execution of function modification of BIOS options, the target option name of each target BIOS option on which the function modification has executed may be acquired, for example, the function modification is executed on {BIOS option 3}, effective manners having correlation relationships with options names are searched for the target taking effect manner corresponding to {BIOS option 3}, wherein the taking effect manner includes the cold reboot and the warm reboot, and the flag state of the target set flag of a BIOS option set including {BIOS option 3} is processed according to the target taking effect manner.

In one exemplary embodiment, the flag state of the target set flag may be processed according to the target taking effect manner in, but not limited to, the following manners: when the target taking effect manner is the warm reboot, the flag state of the target set flag to be in the unset state; and when the target taking effect manner is maintained in the cold reboot, the flag state of the target set flag is converted into the set state.

In some embodiments, in the present embodiment, the flag state of the target set flag may be set to the unset state by default. As shown in FIG. 3, during the execution of BIOS option function modification on {BIOS option 1}, when it is determined that the target taking effect manner of {BIOS option 1} is the warm reboot, the flag state of the target set flag of the BIOS option set including {BIOS option 1} is kept to be in the unset state; in the process of continuing to perform the function modification on {BIOS option 3}, when it is determined that the target taking effect manner of {BIOS option 3} is the cold reboot, the flag state of the target set flag of the BIOS option set including {BIOS option 1, BIOS option 3} is converted into the set state.

In the technical solution provided in step S206, as shown in FIG. 4, after the set attribute corresponding to the BIOS option set is determined, the server reboot manner of the BIOS option set can be determined according to the set attribute, for example, when it is determined that the set attribute corresponding to the BIOS option set is a warm boot attribute, the server reboot manner of the BIOS option set is determined to warm reboot; and when it is determined that the set attribute corresponding to the BIOS option set is a cold boot attribute, it is determined that the server reboot manner of the BIOS option set is the cold reboot. The purpose of the server reboot manner is to control all BIOS options included in the foregoing BIOS option set to take effect after the server is rebooted.

In one exemplary embodiment, the server reboot manner of the BIOS option set may be determined according to the set attribute in, but is not limited to, the following manners: when the set attribute is configured to indicate that there is a cold reboot BIOS option in the BIOS option set, the server reboot manner is determined as the cold reboot; and when the set attribute is configured to indicate that there is no cold reboot BIOS option in the BIOS option set, the server reboot manner is determined as the warm reboot.

In some embodiments, in the present embodiment, when the set attribute is configured to indicate that there is a cold reboot BIOS option in the BIOS option set, that is, in order to control all BIOS options included in the BIOS option set to take effect after the server is rebooted, it may be determined that the server reboot manner is the cold reboot.

In some embodiments, in the present embodiment, when the set attribute is configured to indicate that there is the no cold reboot BIOS option in the BIOS option set, that is, in order to control all BIOS options included in the BIOS option set to take effect after a server is rebooted, it may be determined that the server reboot manner is the warm reboot.

In the technical solution provided in step S208, after the server reboot manner is determined, by rebooting the server in the server reboot manner, all the BIOS options included in the BIOS option set may be controlled to take effect after the server is rebooted.

In one exemplary embodiment, the server may be rebooted in the server reboot manner in, but not limited to, the following manners: when the server reboot manner is cold reboot, a user control instruction currently received by the server is detected; and the server is rebooted according to the server reboot manner and the user control instruction; and a user control instruction on the server is executed when the server reboot manner is a warm reboot, wherein the user control instruction is an instruction initiated by a user for rebooting the server.

Figure 5:
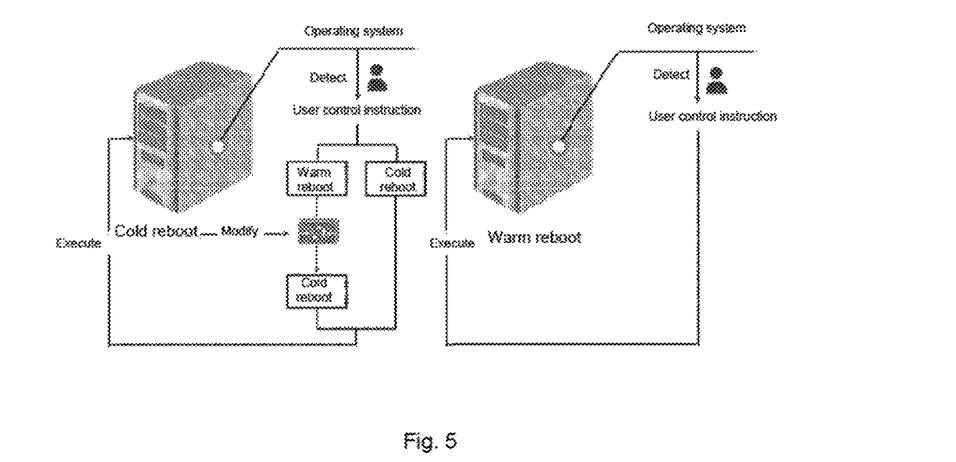
FIG. 5 is a schematic diagram of a server reboot manner according to an embodiment of the present application.

In some embodiments, in the present embodiment, FIG. 5 is a schematic diagram of a server reboot manner according to an embodiment of the present application. As shown in FIG. 5, when the server reboot manner is the warm reboot, all the BIOS options included in the BIOS option set can take effect after the server executes the warm reboot and the cold reboot, Therefore, the user control instruction may be directly executed, without processing the user control instruction.

In one exemplary embodiment, the user control instruction currently received by the server may be detected in, but is not limited to, the following manners: an Operating System (OS) corresponding to the server is accessed; and from the Operating System (OS), a user-initiated instruction that is currently received by the server and reboots the server is detected, as the user control instruction.

In some embodiments, in the present embodiment, the user control instruction is detected by, but is not limited to, accessing an Operating System (OS) corresponding to the server.

In one exemplary embodiment, the server may be rebooted according to the server reboot manner and the user control instruction by, but not limited to, the following manners: when the user control instruction instructs to perform the warm reboot on the server, the user control instruction is modified as performing the cold reboot on the server, and a modified user control instruction is executed; and when the user control instruction instructs to perform the cold reboot on the server, the user control instruction is directly executed.

In some embodiments, in the present embodiment, as shown in FIG. 5, when the server reboot manner is the cold reboot, first, the user control instruction currently received by the server is detected from the OS corresponding to the server, the user control instruction may have two situations, including instructing to perform the warm reboot on the server and instructing to perform the cold reboot on the server, when the user control instruction instructs to perform the warm reboot on the server, the user control instruction is modified to performing the cold reboot on the server, and the modified user control instruction is executed; and when the user control instruction instructs to perform the cold reboot on the server, that is to say, the user control instruction matches the server reboot mode, and the user control instruction may be directly executed.

In one exemplary embodiment, the user control instruction may be modified into the cold reboot executed on the server in, but not limited to, the following manners: a target control instruction carrying cold reboot information is generated; and according to the target control instruction, the user control instruction is modified as performing the cold reboot on the server.

In some embodiments, in the present embodiment, the target control instruction is used to modify the user control instruction to performing the cold reboot on the server.

In one exemplary embodiment, the user control instruction may be modified to performing the cold reboot on the server according to the described target control instruction in, but not limited to, the following manners: the target control instruction is send to a Central Processing Unit (CPU) in the server; and according to the target control instruction, the CPU is controlled to perform the cold reboot on the server.

In some embodiments, in the present embodiment, the execution of rebooting by the server may be controlled by the Central Processing Unit (CPU).

In one exemplary embodiment, the CPU may be controlled to perform the cold reboot on the server according to the target control instruction in, but not limited to, the following manner: register parameters deployed in the server and corresponding to the CPU are modified according to the target control instruction carrying the cold reboot information, wherein the CPU is configured to respond to the target control instruction and control, according to the register parameters, the server to perform the cold reboot.

In some embodiments, in the present embodiment, the CPU may determine, according to the register parameter, a reboot manner executed by the server; therefore, the target control instruction carrying the cold reboot information may be generated, and the register parameter is modified, so that the user control instruction is modified to be the cold reboot executed on the server.

In one exemplary embodiment, the register parameters deployed in the server and corresponding to the CPU may be modified according to the target control instruction carrying the cold reboot information in, but not limited to, the following manners: when the CPU receives the cold reboot information, from server reboot modes and register parameters having a correlation, a cold reboot register parameter corresponding to the cold reboot is acquired; and the register parameter corresponding to the current CPU is modified as the cold reboot register parameter.

In some embodiments, in the present embodiment, the target control instruction may first acquire, from server reboot modes and register parameters having a correlation, the cold reboot register parameter corresponding to the cold reboot; and then the register parameter corresponding to the current CPU is modified as the cold reboot register parameter.

In order to better understand the taking effect process of the BIOS option modifications, the taking effect flow of the BIOS option modifications will be described below in combination with an optional embodiment, but is not used to limit the technical solution of the embodiment of the present disclosure.

Figure 6:
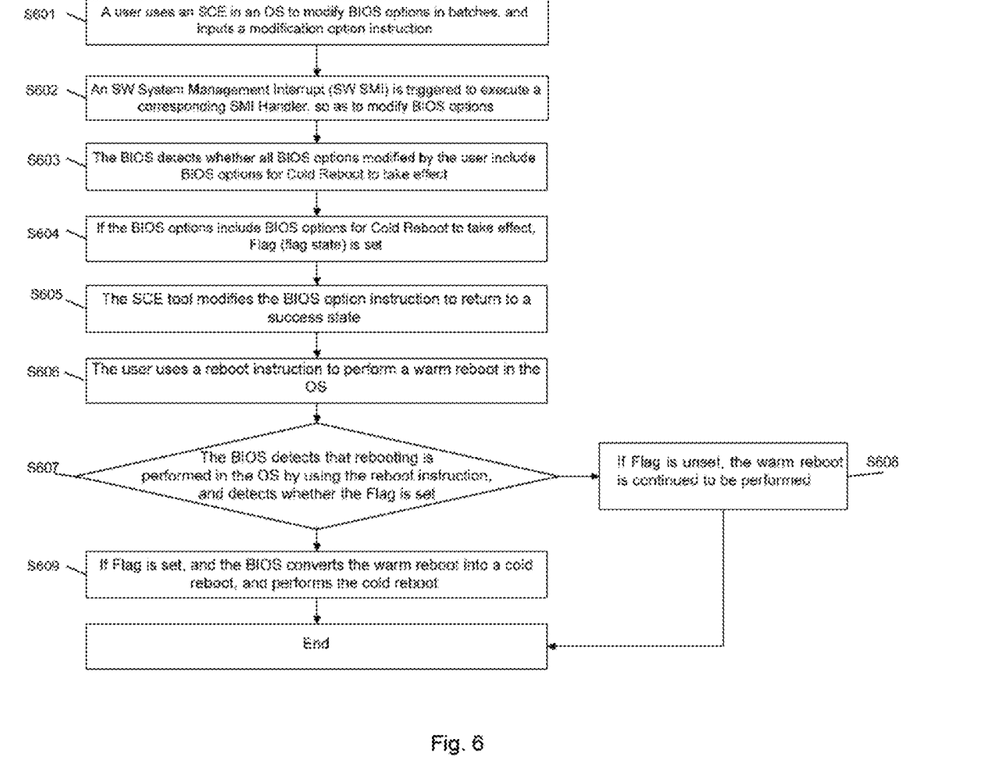
FIG. 6 is a schematic diagram of a flow for BIOS option modifications to take effect according to an embodiment of the present application.

The present embodiment provides a method for BIOS option modifications to take effect. FIG. 6 is a schematic diagram of a flow for BIOS option modifications to take effect according to an embodiment of the present application. As shown in FIG. 6, the method mainly includes the following steps: step S601: a user uses an SCE in an OS to modify BIOS options in batches, and inputs a modification option instruction;

step S602: an SW System Management Interrupt (SW SMI) is triggered to execute a corresponding SMI Handler, so as to modify BIOS options;

step S603: the BIOS detects whether all BIOS options modified by the user include BIOS options for Cold Reboot to take effect;

step S604: if the BIOS options include BIOS options for Cold Reboot to take effect, Flag (flag state) is set;

step S605: the SCE tool modifies the BIOS option instruction to return to a success state;

step S606: the user uses a reboot instruction to perform a warm reboot in the OS;

step S607: the BIOS detects that rebooting is performed in the OS by using the reboot instruction, and detects whether the Flag is set;

step S608: if Flag is unset, the warm reboot is continued to be performed;

step S609: if Flag is set, and the BIOS converts the warm reboot into a cold reboot, and performs the cold reboot.

It should be noted that the embodiments of the present application uses an automatic taking effect manner after the BIOS options are rapidly modified. When BIOS options are modified in batches in an OS by using the SCE tool, the SCE tool may trigger the SW SMI to execute the corresponding SMI handler, and implement option modifications in the SMI handler. After modifying the BIOS options, the BIOS identifies whether the BIOS options modified by the SCE tool include BIOS options for Cold Reboot to take effect, and if so, the corresponding Flag is set. After the SCE tool successfully modifies the BIOS options, the user can directly use an instruction under the OS to perform reboot; after detecting that rebooting is performed in the OS, the BIOS detects whether Flag is set; if Flag is unset, the warm reboot is continued to be performed; and if Flag is set, the BIOS converts the warm reboot into the cold reboot. In this way, the user does not need to process which reboot causes taking effect of the modified options or using which reboot manner, and these are all processed by the method of the embodiments of the application, so that the user is more convenient and faster to use.

From the description of the described embodiments, a person skilled in the art would have been able to clearly understand that the method in the described embodiments may be implemented by using software and necessary general hardware platforms, and of course may also be implemented using hardware, but in many cases, the former is a better embodiment. Based on such understanding, the essence of technical solution of the embodiments of the present application, or in other words, the part of the technical solutions making contributions to the prior art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present application.

Figure 7:
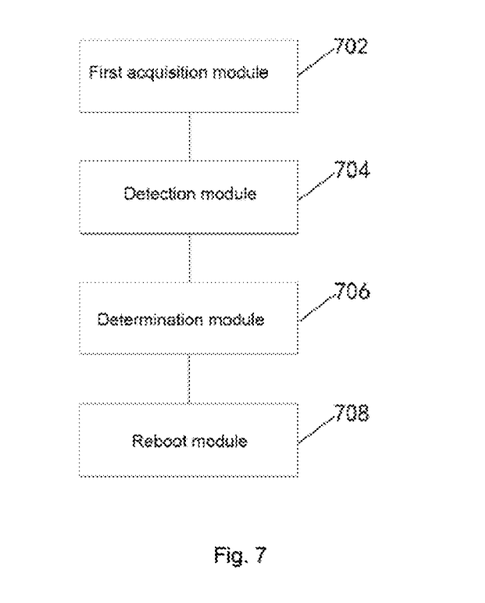
FIG. 7 is a structural block diagram of an apparatus for BIOS option modifications to take effect according to an embodiment of the present application.

FIG. 7 is a structural block diagram of an apparatus for BIOS option modifications to take effect according to an embodiment of the present application. As shown in FIG. 7, the apparatus includes:

a first acquisition module 702, configured to acquire a BIOS option set, wherein function modification has been executed, in a server, on BIOS options in the BIOS option set;

a detection module 704, configured to detect a set attribute of the BIOS option set, wherein the set attribute is configured to indicate whether there is a cold reboot BIOS option in the BIOS option set, and the cold reboot BIOS option is an option of which a function modified is allowed to take effect after a cold reboot is executed;

a determination module 706, configured to determine a server reboot manner for the BIOS option set according to the set attribute, wherein the server reboot manner is configured to control BIOS options in the BIOS option set to take effect after the server reboots; and a reboot module 708, configured to reboot the server by the server reboot manner.

It should be noted that the modules above may be implemented by software or hardware, and the latter may be implemented in the following manner, but is not limited thereto: the modules are located in the same processor; or the modules are located in different processors in an arbitrary combination.

By following the above steps, firstly the BIOS option set, of which function modification has been executed is acquired in a server, then the set attribute of the BIOS option set is detected, wherein it can be determined according to the set attribute whether there is a cold reboot BIOS option in the BIOS option set, the cold reboot BIOS option being an option that is allowed to take effect only when the cold reboot is performed on the modified function; then the server reboot manner for the BIOS option set is determined according to the set attribute, i.e., the server reboot manner determined according to the set attribute may control all BIOS options included in the BIOS option set to take effect after the server is rebooted; and finally the server by the server reboot manner is rebooted. By means of the technical solution, the problem in the related art of low taking effect efficiency of BIOS modifications is solved, and the technical effect of improving the taking effect efficiency of BIOS modifications is achieved.

In one exemplary embodiment, the detection module includes:
a first detecting unit, configured to detect a flag state of a target set flag corresponding to the BIOS option set;
a first determination unit, configured to determine, when the flag state is a set state, that the set attribute of the BIOS option set is a cold boot attribute, wherein the cold boot attribute is configured to indicate that there is a cold reboot BIOS option in the BIOS option set; and
a second determination unit, configured to determine, when the flag state is an unset state, that the set attribute of the BIOS option set is a warm boot attribute, wherein the warm boot attribute is configured to indicate that there is the no cold reboot BIOS option in the BIOS option set.

In one exemplary embodiment, the first detection unit is further configured to:
detect an execution state of the cold reboot BIOS option during an execution of the function modification, wherein the execution state is configured to indicate whether the function modification is performed on the cold reboot BIOS option;
determine, according to the execution state, the flag state of the target set flag corresponding to the BIOS option set.

In one exemplary embodiment, the first detection unit is further configured to:
read a parameter stored in a state flag register (FLAG);
when the parameter is a first values, determine that the flag state is in the set state; and
when parameter is a second value, determine that the flag state is in the unset state.

In one exemplary embodiment, the first detection unit is further configured to:
when the execution state indicates that the function modification is not performed on the cold reboot BIOS option during the execution of the function modification, determine that the flag state of the target set flag is set to the unset state; and
when the execution state indicates that the function modification is performed on the cold reboot BIOS option during the execution of the function modification, determine that the flag state is converted to the set state.

In one exemplary embodiment, the apparatus further includes:
an acquiring module, configured to acquire, before detecting a flag state of a target set flag corresponding to the BIOS option set and in a process of executing the function modification, a target taking effect manner for each target BIOS option on which the function modification has been executed;
a processing module, configured to process the flag state of the target set flag according to the target taking effect manner.

In one exemplary embodiment, the acquisition module includes:
a first acquisition unit, configured to acquire a target option name of each target BIOS option on which the function modification has been executed; and
a second acquisition unit, configured to acquire, from effective manners having correlation relationships with options names, the target taking effect manner corresponding to each target BIOS option, wherein the effective manners includes the cold reboot and warm reboot.

In one exemplary embodiment, the processing module includes:

a keeping unit, configured to keep the flag state of the target set flag to be in the unset state when the target taking effect manner is a warm reboot,
a conversion unit, configured to convert the flag state of the target set flag into the set state when the target taking effect manner is the cold reboot.

In one exemplary embodiment, the determination module includes:
a third determination unit, configured to determine, when the set attribute is configured to indicate that there is a cold reboot BIOS option in the BIOS option set, that the server reboot manner is the cold reboot; and
a fourth determination unit, configured to determine, when the set attribute is configured to indicate that there is no cold reboot BIOS option in the BIOS option set, that the server reboot manner is a warm reboot.

In one exemplary embodiment, the reboot module includes:
a second detection unit, configured to detect, when the server reboot manner is cold reboot, a user control instruction currently received by the server; and rebooting the server according to the server reboot manner and the user control instruction; and
an execution unit, configured to execute a user control instruction on the server when the server reboot manner is warm reboot, wherein the user control instruction is an instruction initiated by a user for rebooting the server.

In one exemplary embodiment, the second detection unit is further configured to:
access an Operating System (OS) corresponding to the server;
detect, from the Operating System (OS), a user-initiated instruction that is currently received by the server to reboot the server, as the user control instruction.

In one exemplary embodiment, the second detection unit is further configured to:
when the user control instruction instructs to perform the warm reboot on the server, modify the user control instruction as performing the cold reboot on the server, and execute a modified user control instruction; and
when the user control instruction instructs to perform the cold reboot on the server, directly execute the user control instruction.

In one exemplary embodiment, the second detection unit is further configured to:
generate a target control instruction carrying cold reboot information; and
modify, according to the target control instruction, the user control instruction as performing the cold reboot on the server.

In one exemplary embodiment, the second detection unit is further configured to:
send the target control instruction to a Central Processing Unit (CPU) in the server; and
control, according to the target control instruction, the CPU to perform the cold reboot on the server.

In one exemplary embodiment, the second detection unit is further configured to: modify register parameters deployed in the server and corresponding to the CPU according to the target control instruction carrying the cold reboot information, wherein the CPU is configured to respond to the target control instruction and control, according to the register parameters, the server to perform the cold reboot.

In one exemplary embodiment, the described second detection unit is further configured to:

when the CPU receives the cold reboot information, acquire, from register parameters having correlation relationships with server reboot manners, a cold reboot register parameter corresponding to the cold reboot; and modify the register parameter corresponding to the current CPU as the cold reboot register parameter.

In one exemplary embodiment, the first acquisition module includes:

a creating unit, configured to create, when it is detected that a BIOS option modification tool is started, an initial BIOS option set, wherein the BIOS option modification tool is configured to execute the function modification on the BIOS options;

a third acquisition unit, configured to acquire, in a process of the BIOS option modification tool executing the function modification on the BIOS options, target BIOS options on which the function modification has been executed; and;

an adding unit, configured to add the target BIOS options to the initial BIOS option set to obtain the BIOS option set.

The embodiments of the present application further provide a computer readable storage medium storing a computer program, wherein the computer program is configured to execute, when running, the steps in any one of the described method embodiments.

In one exemplary embodiment, the computer readable storage medium may include, but is not limited to, any medium that can store a computer program, such as a USB flash drive, a Read-Only Memory (ROM), a Random Access Memory (RAM), a removable hard disk, a magnetic disk, or an optical disc.

Some embodiments of the present disclosure also provide an electronic device, including a memory and a processor, wherein the memory stores a computer program, and the processor is configured to run the computer program, so as to execute the steps in any one of the method embodiments.

In one exemplary embodiment, the electronic device can further include a transmission device and an input/output device, wherein the transmission device is connected to the processor, and the input/output device is connected to the processor.

For examples in the present embodiment, reference can be made to the examples described in the described embodiments and exemplary embodiments, and thus they will not be repeated again in the present embodiment.

Obviously, those skilled in the art should understand that the modules or steps in some embodiments of the present application can be implemented by using a general computing device, and they can be integrated in a single computing device, and can also be distributed over a network consisting of a plurality of computing devices. They may be implemented by using executable program codes of the computing devices. Thus, they can be stored in a storage device and executed by the computing devices. Furthermore, in some cases, the shown or described steps may be executed in an order different from that described here, or they can be respectively implemented by individual Integrated Circuit modules, or they can be implemented by making a plurality of the modules or steps into a single Integrated Circuit module. Hence, the present application is not limited to any specific combinations of hardware and software.

The content above merely relates to preferred embodiments of the present application and is not intended to limit the present application. For a person skilled in the art, the present application may have various modifications and variations. Any modifications, equivalent replacements, improvements, etc. made within the principle of the present application shall all belong to the scope of protection of the present application.

What is claimed is:

1. A method for input/output system (BIOS) option modifications to take effect, comprising:

acquiring a BIOS option set, wherein function modification has been executed, in a server, on BIOS options in the BIOS option set;

detecting a set attribute of the BIOS option set, wherein the set attribute is configured to indicate whether there is a cold reboot BIOS option in the BIOS option set, and the cold reboot BIOS option is an option of which a function modified is allowed to take effect after a cold reboot is executed;

determining a server reboot manner for the BIOS option set according to the set attribute, wherein the server reboot manner is configured to control BIOS options in the BIOS option set to take effect after the server reboots; and rebooting the server by the server reboot manner.

2. The method as claimed in 1, wherein detecting the set attribute of the BIOS option set comprises:

detecting a flag state of a target set flag corresponding to the BIOS option set;

in a case that the flag state is a set state, determining that the set attribute of the BIOS option set is a cold boot attribute, wherein the cold boot attribute is configured to indicate that there is a cold reboot BIOS option in the BIOS option set;

in a case that the flag state is an unset state, determining that the set attribute of the BIOS option set is a warm boot attribute, wherein the warm boot attribute is configured to indicate that there is no cold reboot BIOS option in the BIOS option set.

3. The method as claimed in 2, wherein detecting the flag state of the target set flag corresponding to the BIOS option set comprises:

detecting an execution state of the cold reboot BIOS option during an execution of the function modification, wherein the execution state is configured to indicate whether the function modification is performed on the cold reboot BIOS option;

determining, according to the execution state, the flag state of the target set flag corresponding to the BIOS option set.

4. The method as claimed in 3, wherein determining, according to the execution state, the flag state of the target set flag corresponding to the BIOS option set comprises:

in a case that the execution state indicates the function modification has not been performed for the cold reboot BIOS option during the execution of the function modification, determining that the flag state of the target set flag is set to the unset state; and in a case that the execution state indicates the function modification has been performed for the cold reboot BIOS option during the execution of the function modification, determining that the flag state is converted to the set state.

5. The method as claimed in 2, wherein detecting the flag state of the target set flag corresponding to the BIOS option set comprises:

reading a parameter stored in a state flag register (FLAG);

in a case that the parameter is a first value, determining that the flag state is in the set state; and in the case that the parameter is a second value, determining that the flag state is in the unset state.

6. The method as claimed in 2, wherein before detecting the flag state of the target set flag corresponding to the BIOS option set, the method further comprises:
during an execution of the function modification, acquiring a target taking effect manner for each target BIOS option on which the function modification has been executed; and
processing the flag state of the target set flag according to the target taking effect manner.

7. The method as claimed in 6, wherein during the execution of the function modification, acquiring the target taking effect manner for each target BIOS option on which the function modification has been executed comprises:
acquiring a target option name of each target BIOS option on which the function modification has been executed;
acquiring, from effective manners having correlation relationships with option names, the target taking effect manner corresponding to each target BIOS option, wherein the effective manners comprises the cold reboot and warm reboot.

8. The method as claimed in claim 7, the cold reboot refers to reboot the server by turning off power and then turning on the power, the ware reboot refers to reboot computer by software control without turning off the power.

9. The method as claimed in 6, wherein processing the flag state of the target set flag according to the target taking effect manner comprises:
in a case that the target taking effect manner is a warm reboot, keeping the flag state of the target set flag to be in the unset state; and
in a case that the target taking effect manner is the cold reboot, converting the flag state of the target set flag into the set state.

10. The method as claimed in 1, wherein determining the server reboot manner for the BIOS option set according to the set attribute comprises:
in a case that the set attribute indicates that there is a cold reboot BIOS option in the BIOS option set, determining that the server reboot manner is the cold reboot; and
in a case that the set attribute indicates that there is no cold reboot BIOS option in the BIOS option set, determining that the server reboot manner is a warm reboot.

11. The method as claimed in 1, wherein rebooting the server by the server reboot manner comprises:
detecting, in a case of the cold reboot for the server reboot manner, a user control instruction currently received by the server; and rebooting the server according to the server reboot manner and the user control instruction; and
executing a user control instruction on the server in a case of a warm reboot for the server reboot manner, wherein the user control instruction is an instruction initiated by a user for rebooting the server.

12. The method as claimed in 11, wherein detecting the user control instruction currently received by the server comprises:
accessing an Operating System (OS) corresponding to the server;
detecting, from the OS, a user-initiated instruction that is currently received by the server to reboot the server, as the user control instruction.

13. The method as claimed in 11, wherein rebooting the server according to the server reboot manner and the user control instruction comprises:

in a case that the user control instruction instructs to perform the warm reboot on the server, modifying the user control instruction as performing the cold reboot on the server, and executing a modified user control instruction; and
in a case that the user control instruction instructs to perform the cold reboot on the server, directly executing the user control instruction.

14. The method as claimed in 13, wherein modifying the user control instruction as performing the cold reboot on the server comprises:
generating a target control instruction carrying cold reboot information; and
modifying, according to the target control instruction, the user control instruction as performing the cold reboot on the server.

15. The method as claimed in 14, wherein modifying, according to the target control instruction, the user control instruction as performing the cold reboot on the server comprises:
sending the target control instruction to a Central Processing Unit (CPU) in the server; and
controlling, according to the target control instruction, the CPU to perform the cold reboot on the server.

16. The method as claimed in 15, wherein controlling, according to the target control instruction, the CPU to perform the cold reboot on the server comprises:
modifying register parameters deployed in the server and corresponding to the CPU according to the target control instruction carrying the cold reboot information, wherein the CPU is configured to respond to the target control instruction and control, according to the register parameters, the server to perform the cold reboot.

17. The method as claimed in 16, wherein modifying the register parameters deployed in the server and corresponding to the CPU according to the target control instruction carrying the cold reboot information comprises:
in a case that the CPU receives the cold reboot information, acquiring, from register parameters having correlation relationships with server reboot manners, a cold reboot register parameter corresponding to the cold reboot; and
modifying the register parameter corresponding to the current CPU as the cold reboot register parameter.

18. The method as claimed in 1, wherein acquiring a BIOS option set, wherein function modification has been executed, in a server, on BIOS options in the BIOS option set comprises:
in a case that an activation of a BIOS option modification tool is detected, creating an initial BIOS option set, wherein the BIOS option modification tool is configured to execute the function modification on the BIOS options;
in a process of the BIOS option modification tool executing the function modification on the BIOS options, acquiring target BIOS options on which the function modification has been executed; and
adding the target BIOS options to the initial BIOS option set to obtain the BIOS option set.

19. A non-volatile readable storage medium, wherein the non-volatile readable storage medium comprises a stored program, and when the program runs, following actions are executed:
acquiring a BIOS option set, wherein function modification has been executed, in a server on BIOS options in the BIOS option set;

detecting a set attribute of the BIOS option set, wherein the set attribute is configured to indicate whether there is a cold reboot BIOS option in the BIOS option set, and the cold reboot BIOS option is an option of which a function modified is allowed to take effect after a cold reboot is executed;

determining a server reboot manner for the BIOS option set according to the set attribute, wherein the server reboot manner is configured to control BIOS options in the BIOS option set to take effect after the server reboots; and rebooting the server by the server reboot manner.

20. An electronic device, comprising a memory and a processor, wherein the memory stores a computer program, and the processor is configured to execute following actions by the computer program:

acquiring a BIOS option set, wherein function modifications has been executed, in a server, on BIOS options in the BIOS option set;

detecting a set attribute of the BIOS option set, wherein the set attribute is configured to indicate whether there is a cold reboot BIOS option in the BIOS option set, and the cold reboot BIOS option is an option of which a function modified is allowed to take effect after a cold reboot is executed;

determining a server reboot manner for the BIOS option set according to the set attribute, wherein the server reboot manner is configured to control of BIOS options in the BIOS option set to take effect after the server reboots; and rebooting the server by the server reboot manner.

* * * * *